United States Patent
Wu et al.

(10) Patent No.: US 11,745,478 B2
(45) Date of Patent: Sep. 5, 2023

(54) TRANSPARENT ELASTIC COMPOSITE FILM AND ITS ENCAPSULATION STRUCTURE AND METHOD FOR FORMING THE ENCAPSULATION STRUCTURE

(71) Applicant: INDUSTRIAL TECHNOLOGY RESEARCH INSTITUTE, Hsinchu (TW)

(72) Inventors: Hsin-Chung Wu, Sihu Township (TW); Mei-Ru Lin, Changhua (TW); En-Yu Pan, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/903,516

(22) Filed: Sep. 6, 2022

(65) Prior Publication Data
US 2023/0191755 A1 Jun. 22, 2023

(30) Foreign Application Priority Data
Dec. 17, 2021 (TW) .................. 110147488

(51) Int. Cl.
*B32B 27/40* (2006.01)
*B32B 27/08* (2006.01)
(Continued)

(52) U.S. Cl.
CPC .............. *B32B 27/08* (2013.01); *B32B 27/26* (2013.01); *B32B 27/308* (2013.01); *B32B 27/40* (2013.01);
(Continued)

(58) Field of Classification Search
CPC ....... B32B 27/08; B32B 27/26; B32B 27/308; B32B 27/40; B32B 2250/03;
(Continued)

(56) References Cited

U.S. PATENT DOCUMENTS 4,691,045 A 9/1987 Fukuchi et al.
5,741,872 A 4/1998 Smith
(Continued)

FOREIGN PATENT DOCUMENTS

JP 3710316 B2 8/2005
JP 2007-196663 A 8/2007
(Continued)

OTHER PUBLICATIONS

Taiwanese Office Action and Search Report for Taiwanese Application No. 110147488, dated Jan. 7, 2023.
Leväsalmi et al., "Poly(4-methyl-1-pentene)-Supported Polyelectrolyte Multilayer Films: Preparation and Gas Permeability[1]," Macromolecules, American Chemical Society, vol. 30, No. 6, 1997, pp. 1752-1757.

*Primary Examiner* — Lawrence D Ferguson
(74) *Attorney, Agent, or Firm* — Birch, Stewart, Kolasch & Birch, LLP (57) ABSTRACT

The present disclosure provides a transparent elastic composite film, which includes a first film layer; a thermoplastic polyurethane layer; and a second film layer; wherein the first film layer and the second film layer have a crosslinked network structure; the first film layer includes acrylic resin and aliphatic polyisocyanate, wherein the acrylic resin includes hydroxyl-containing acrylic resin, and a weight ratio of the acrylic resin to the aliphatic polyisocyanate is 1/1 to 1/1.2, and a weight ratio of the hydroxyl-containing acrylic resin to the acrylic resin is 0.1/1 to 0.18/1.

23 Claims, 2 Drawing Sheets

(51) Int. Cl.
*B32B 27/30* (2006.01)
*B32B 27/26* (2006.01)

(52) U.S. Cl.
CPC ....... *B32B 2250/03* (2013.01); *B32B 2250/04* (2013.01); *B32B 2250/05* (2013.01); *B32B 2250/24* (2013.01); *B32B 2307/412* (2013.01); *B32B 2307/51* (2013.01); *B32B 2333/08* (2013.01); *B32B 2333/12* (2013.01); *B32B 2367/00* (2013.01); *B32B 2369/00* (2013.01); *B32B 2375/00* (2013.01); *B32B 2379/08* (2013.01); *B32B 2383/00* (2013.01)

(58) Field of Classification Search
CPC ............ B32B 2250/05; B32B 2250/24; B32B 2367/00; B32B 2383/00
See application file for complete search history.

(56) References Cited

U.S. PATENT DOCUMENTS

| | | |
|---|---|---|
| 5,756,214 A | 5/1998 | Waldron et al. |
| 5,910,370 A | 6/1999 | Katsura et al. |
| 5,932,352 A | 8/1999 | Higgins |
| 8,551,285 B2 | 10/2013 | Ho et al. |
| 10,962,688 B2 | 3/2021 | Thompson et al. |
| 2018/0345639 A1 | 12/2018 | Kamada et al. |
| 2019/0092896 A1 | 3/2019 | Qian et al. |

FOREIGN PATENT DOCUMENTS

| | | |
|---|---|---|
| JP | 2020-142474 A | 9/2020 |
| TW | M481570 U | 7/2014 |
| TW | I647862 B | 1/2019 |
| TW | 202130762 A | 8/2021 |

TRANSPARENT ELASTIC COMPOSITE FILM AND ITS ENCAPSULATION STRUCTURE AND METHOD FOR FORMING THE ENCAPSULATION STRUCTURE

This application claims the benefit of Taiwan application Serial No. 110147488, filed Dec. 17, 2021, the subject matter of which is incorporated herein by reference.

TECHNICAL FIELD

The disclosure relates to a transparent elastic composite film and its encapsulation structure and method for forming the encapsulation structure.

BACKGROUND

The compositions of the polymeric materials in transparent elastic composite film could be tuned in order to meet various applications demands, such as an encapsulation film for flexible hybrid electronics (FHE) which is applied in smart wearable device or personalized healthcare; and a peelable release film which finds applications in automobile, display panel or flexible printed circuit (FPC) board.

The transparent elastic composite film not only has small volume, light weight, good flexibility, and easy to integrate to different kinds of substrate, but also needs to be consistent with the design and conformity of the substrate. Therefore, during hot pressing process, the transparent elastic composite film needs to fill-in the uneven structure of a substrate, in order to solve the surface non-uniformity on circuit boards or electronic devices, to inhibit glue overflowing the circuit boards, or to prevent devices structure damaging.

Therefore, a new transparent elastic composite film is needed, which can conform to the uneven structure of the substrate during a hot pressing process. Moreover, the surface contact characteristic of the transparent elastic composite film with a substrate can be adjusted through tuning the compositions and the processing method of the transparent elastic composite films, for example, the transparent elastic composite film can selectively function as a peelable release film or an encapsulant film with an excellent adhesion through a specific processing condition.

SUMMARY

An embodiment of the present disclosure provides a transparent elastic composite film. The transparent elastic composite film includes: a first film layer; a thermoplastic polyurethane layer disposed on the first film layer; and a second film layer disposed on the thermoplastic polyurethane layer; wherein the first film layer and the second film layer have crosslinked network structures; the first film layer includes acrylic resin and aliphatic polyisocyanate, and the acrylic resin includes hydroxyl-containing acrylic resin, wherein a weight ratio of the acrylic resin to the aliphatic polyisocyanate is 1/1 to 1/1.2, a weight ratio of the hydroxyl-containing acrylic resin to the acrylic resin is 0.1/1 to 0.18/1.

Another embodiment of the present disclosure provides an encapsulation structure of a transparent elastic composite film. The encapsulation structure includes: a first body having at least a first surface; a first film layer disposed the on the first surface of the first body; a thermoplastic polyurethane layer disposed on the first film layer; and a second film layer disposed on thermoplastic polyurethane layer; wherein the first film layer and the second film layer have crosslinked network structures; the first film layer includes acrylic resin and aliphatic polyisocyanate, and the acrylic resin includes hydroxyl-containing acrylic resin, wherein a weight ratio of the acrylic resin to the aliphatic polyisocyanate is 1/1 to 1/1.2, a weight ratio of the hydroxyl-containing acrylic resin to the acrylic resin is 0.1/1 to 0.18/1.

Yet another embodiment of the present disclosure provides an encapsulation process. The encapsulation process includes encapsulating a surface of a body with a transparent elastic composite film by using a hot pressing.

The above and other embodiments of the disclosure will become better understood with regard to the following detailed description of the non-limiting embodiment(s).

DETAILED DESCRIPTION

Figure 1:
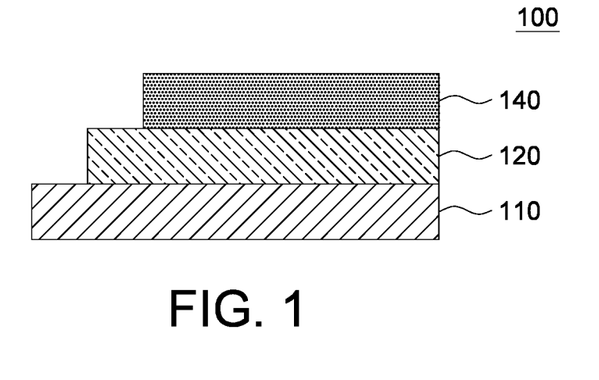
FIG. 1 is a cross-section view of a portion of a transparent elastic composite film according to an embodiment of the present disclosure.

FIG. 1 is a cross-section view of a portion of a transparent elastic composite film according to an embodiment of the present disclosure. Referring to FIG. 1, in an embodiment of the present disclosure, the transparent elastic composite film 100 includes a first film layer 110, a thermoplastic polyurethane layer 120 and a second film layer 140. The thermoplastic polyurethane layer 120 is disposed on the first film layer 110. The second film layer 140 is disposed on the thermoplastic polyurethane layer 120.

In some embodiments, the compositions of the first film layer 110 and the second film layer 140 include acrylic resin and aliphatic polyisocyanate. The acrylic resin includes hydroxyl-containing acrylic resin. The first film layer 110 and the second film layer 140 have crosslinked network structures.

In some embodiments, the acrylic resin includes 2-hydroxyethyl methacrylate, hydroxyethyl acrylate, isobutyl methacrylate, alkyl methacrylate, dodecyl methacrylate or a combination thereof. The aliphatic polyisocyanate includes hexamethylene diisocyanate, hexamethylene diisocyanate trimer, hexamethylene diisocyanate biuret, isophorone diisocyanate trimer or a combination thereof.

In some embodiments, the composition of the first film layer 110 further includes polysiloxane, an urethanizing catalyst, a solvent or a mixture thereof. In some embodiments, the solvent can include butanone, butyl acetate, ethyl acetate or a combination thereof.

In some embodiments, a weight ratio of the acrylic resin to the aliphatic polyisocyanate of the first film layer 110 is 1/1 to 1/1.2, such as about 1/1 to 1/1.15, or about 1/1 to 1/1.1, etc., but is not limited thereto.

In some embodiments, a weight ratio of the hydroxyl-containing acrylic resin to the acrylic resin of the first film layer 110 is 0.1/1 to 0.18/1, such as about 0.1/1 to 0.16/1, or about 0.1/1 to 0.15/1, etc., but is not limited thereto.

In some embodiments, a weight ratio of the acrylic resin to the polysiloxane of the first film layer 110 is 1/0.001 to 1/0.02, such as about 1/0.002 to 1/0.015, or about 1/0.006 to 1/0.01, etc., but is not limited thereto.

In some embodiments, a weight ratio of the acrylic resin to the solvent of the first film layer 110 is 1/1 to 1/2.5, such as about 1/1.25 to 1/2.25, or about 1/1.5 to 1/2, etc., but is not limited thereto.

In some embodiments, a composition of the first film layer 110 and a composition of the second film layer 140 is the same.

In some embodiments, a composition of the first film layer 110 and a composition of the second film layer 140 is different In some embodiments, the first film layer 110 has an endothermic softening peak at 180° C. to 208° C.

In some embodiments, the transparent elastic composite film 100 can conform to the uneven surface of the substrate during a hot pressing process. For example, during the hot pressing process of the transparent elastic composite film 100 and the substrate having the uneven surface, the transparent elastic composite film 100 has a good filling ability, which can fill-in voids or uneven structure on the substrate to form a protection film so as to inhibit glue overflowing or to prevent device structure damaging.

In some embodiments, the transparent elastic composite film 100 is a release film. The surface contact characteristic of the transparent elastic composite film 100 to a substrate or an electronic device can be adjusted through tuning the compositions of the first film layer 110 and the processing method of the transparent elastic composite film 100 to obtain a transparent elastic composite film 100 functioning as a peelable release film.

Figure 2:
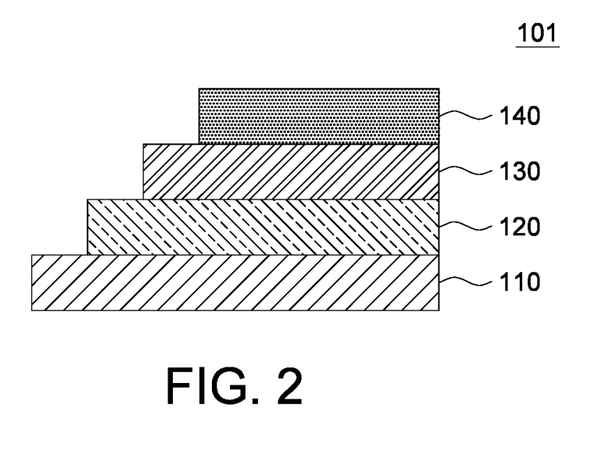
FIG. 2 is a cross-section view of a portion of a transparent elastic composite film according to another embodiment of the present disclosure.

FIG. 2 is a cross-section view of a transparent elastic composite film according to another embodiment of the present disclosure.

Referring to FIG. 2, in the embodiment of the present disclosure, the transparent elastic composite film 101 further includes a polymer 130 disposed between the second film layer 140 and the thermoplastic polyurethane layer 120. The second film layer 140 is disposed on the polymer 130. The polymer 130 is disposed on the thermoplastic polyurethane layer 120. In addition, the thermoplastic polyurethane layer 120 is disposed on the first film layer 110.

In some embodiments, the polymer 130 includes polyethylene terephthalate, polycarbonate, polyimide, or a mixture thereof.

In some embodiments, the polymer 130 of the transparent elastic composite film 101 provides stiffness to the transparent elastic composite film 101, which can improve the processability of the transparent elastic composite film 101.

In some embodiments, the transparent elastic composite film 101 is a release film. The surface contact characteristic of the transparent elastic composite film 101 to a substrate can be adjusted through tuning the compositions of the first film layer 110 and the processing condition of the transparent elastic composite film 101, to obtain a transparent elastic composite film 101 functioning as a peelable release film.

Figure 3:
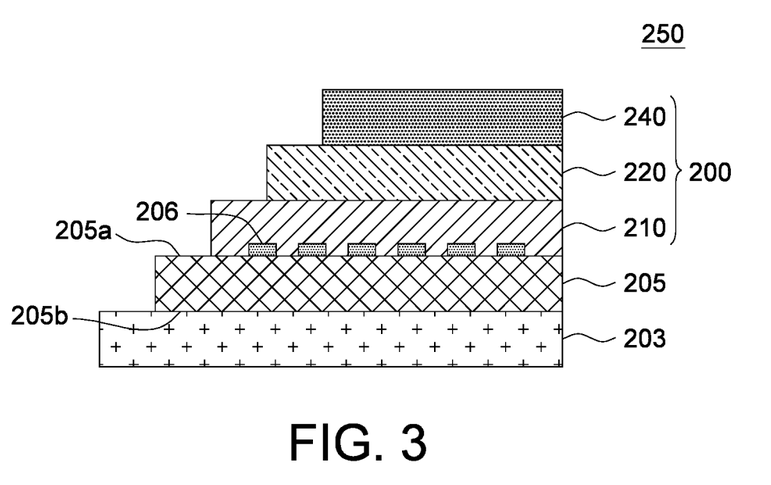
FIG. 3 is a cross-section view of a portion of an encapsulation structure of a transparent elastic composite film according to yet another embodiment of the present disclosure.

FIG. 3 is a cross-section view of an encapsulation structure of a transparent elastic composite film according to yet another embodiment of the present disclosure.

Referring to FIG. 3, in the embodiment of the present disclosure, an encapsulation structure 250 of a transparent elastic composite film 200 includes a first body 205 having at least a first surface 205a; a first film layer 210 disposed on the first surface 205a of the first body 205; a thermoplastic polyurethane layer 220 disposed on the first film layer 210; and a second film layer 240 disposed on the thermoplastic polyurethane layer 220. In some embodiments, a composition of the first film layer 210 includes an acrylic resin and an aliphatic polyisocyanate. The acrylic resin includes a hydroxyl-containing acrylic resin. The first film layer 210 and the second film layer 240 have crosslinked network structures.

In some embodiments, the acrylic resin includes 2-hydroxyethyl methacrylate, hydroxyethyl acrylate, isobutyl methacrylate, alkyl methacrylate, dodecyl methacrylate or a combination thereof. The aliphatic polyisocyanate includes hexamethylene diisocyanate, hexamethylene diisocyanate trimer, hexamethylene diisocyanate biuret, isophorone diisocyanate trimer, or a combination thereof.

In some embodiments, the composition of the first film layer 210 further includes polysiloxane, an urethanizing catalyst, a solvent or a mixture thereof. In some embodiments, the solvent includes butanone, butyl acetate, ethyl acetate, or a combination thereof.

In some embodiments, a weight ratio of the acrylic resin to the aliphatic polyisocyanate of the first film layer 210 is 1/1 to 1/1.2, such as about 1/1 to 1/1.15, or about 1/1 to 1/1.1, etc., but is not limited thereto.

In some embodiments, a weight ratio of the hydroxyl-containing acrylic resin to the acrylic resin of the first film layer 210 is 0.1/1 to 0.18/1, such as about 0.1/1 to 0.16/1, or about 0.1/1 to 0.15/1, etc., but is not limited thereto.

In some embodiments, a polymer may be disposed between the second film layer 240 and the thermoplastic polyurethane layer 220 (not shown in FIG. 3), but not limited thereto. As described above, the polymer can provide stiffness to the transparent elastic composite film, which can improve the processability of the transparent elastic composite film. For example, the polymer includes polyethylene terephthalate, polycarbonate, polyimide, etc., but is not limited thereto.

In some embodiments, the first body 205 includes copper sheet, ethylene terephthalate, thermoplastic polyurethane layer, thermoset polyurethane layer or thermoplastic polyester elastomer.

In some embodiments, the encapsulation structure 250 further includes a second body 203 disposed on a second surface 205b of the first body 205, opposing to the first surface 205a. In some embodiments, the second body 203 includes textile, polyethylene terephthalate, a thermoplastic polyurethane layer, a thermoset polyurethane layer or a thermoplastic polyester elastomer.

In some embodiments, the first surface 205a is an uneven surface. The transparent elastic composite film 200 can conform to the uneven first surface 205a of the first body 205, during a hot pressing process. For example, during the hot pressing process of the transparent elastic composite film 200 and the first body 205 having uneven surface, the transparent elastic composite film 200 having a good filling ability, which can fill-in the uneven region so as to obtain an encapsulation structure 250 of the first body 205 and the transparent elastic composite film 200 having a good surface uniformity. Under a specific hot pressing condition, the transparent elastic composite film 200 has a good adhesion to the first body 205 so as to protect the most fragile part of the first body 205, such as the panel part of a flexible display device.

In some embodiments, the first surface 205a of the first body 205 has a metal wiring 206 arranged thereon. In some embodiments, during a hot pressing process of the transparent elastic composite film 200 to the first surface 205a of the first body 205 having the metal wiring 206 arranged thereon, the transparent elastic composite film 200 has a good filling ability, and can fill-in the uneven region due to the existence of the metal wiring 206. Under a specific hot pressing condition, the transparent elastic composite film 200 has a good adhesion to the first body 205 so as to protect the most fragile part of the first body 205, such as the wiring part of a flexible electronic product.

In some embodiments, a hot pressing is used to encapsulate the transparent elastic composite film 100, 101 or 200 on a surface of a body. The body includes a substrate having an uneven surface. When a hot pressing temperature is 150° C. to 180° C., an adhesion strength of the transparent elastic composite film 100, 101 or 200 from the surface of the body is ≤25 g. When the hot pressing temperature is 190° C. to 200° C., an adhesion rating scale by tape test according to ASTM D3359 standard of the transparent elastic composite film 100, 101 or 200 from the surface of the body is classified as 5B (indicating that no detachment occurs).

Therefore, the present disclosure provides a transparent elastic composite film. The surface contact characteristic of the transparent elastic composite film to substrate can be adjusted through tuning the compositions of the transparent elastic composite film and the processing method. The transparent elastic composite film can selectively function as a peelable release film or an encapsulation film with excellent adhesive properties. Some experiments are illustrated below to verify the effects of the present disclosure. Table 1 illustrates Example 1 to Example 5, and Comparative example 1 to Comparative example 3. Table 2 illustrates Example 6 to Example 11, and Comparative example 4 to Comparative example 5. Table 3 illustrates Example 12 to Example 13, and Comparative example 6 to Comparative example 7. However, the present disclosure is not limited to the following content.

EMBODIMENT

Example 1 and Example 2

Raw materials: 2-hydroxyethyl methacrylate (2-HEMA, Mitsubishi Plastics, Inc.); hydroxyethyl acrylate (2-HEA, Mitsubishi Plastics, Inc.); isobutyl methacrylate (i-BMA, Mitsubishi Plastics, Inc.); alkyl methacrylate (AMA, Mitsubishi Plastics, Inc.); Lauryl methacrylate (LMA, Mitsubishi Plastics, Inc.); hexamethylene diisocyanate (HDI trimer, Tolonate HDT-90B); polysiloxane (BYK3600); ethyl acetate (EAC, Echo Chemical Co., Ltd.); butyl acetate (BAC, Echo Chemical Co., Ltd.); MEK (butanone, Echo Chemical Co., Ltd.); azobisisobutyronitrile initiator (AIBN, Echo Chemical Co., Ltd.); and an urethanizing catalyst (Fomrez UL 29).

100 parts by weight of a mixture of acrylic resins according to the ratio shown in the table 1 were dissolved in 100-250 parts by weight of an ethyl acetate solvent, and were stirred for 1.5 hours to 3 hours, at a temperature of 80° C. to 85° C. to form an acrylic resin mixture having a solid content of 30% to 50%. Next, 0.3 phr of an azobisisobutyronitrile initiator was added to the acrylic resin mixture, and stirred for 6 hours to 8 hours. Next, polysiloxane, urethanizing catalyst, hexamethylene diisocyanate and a mixed solvent (butyl acetate/ethyl acetate/butanone) with the parts by weight ratio according to the table 1, were added and stirred for 30 minutes at the room temperature to obtain a polyurethane solution.

The polyurethane solution of Example 1 as shown in the table 1 was coated and dried, then a small amount of the dried polyurethane was placed in a sample plate of differential scanning calorimetry (DSC), and the sample plate was sealed with a standard cover to perform DSC analysis. During heat scanning, the temperature was increased from 25° C. to 250° C. with a heating rate of 20° C./min in a nitrogen environment. Throughout the temperature increment steps, a relatively flat endothermic plateau was observed, and an endothermic softening peak at about 181° C. appeared, indicating that linear-segmented polyurethane has endothermic softening, flowability and adhesion properties. However, since the glass transition temperature of the polyurethane solution prepared by the composition of Example 1 was below room temperature, no steep change in glass transition temperature was observed.

The DSC measurement of the polyurethane prepared by Example 2 was shown in table 1. Throughout the temperature increment steps, a relatively flat endothermic plateau was observed, and an endothermic softening peak at about 183° C. appeared, indicating that linear-segmented polyurethane had endothermic softening, flowability and adhesion properties. Since the glass transition temperature of the polyurethane prepared by the composition of Example 2 was below room temperature, no steep change in glass transition temperature was observed.

Example 3 and Example 4

The polyurethanes prepared by Example 3 and Example 4 had raw material with parts by weight ratio as shown in the table 1. The DSC analysis were performed to the polyurethanes prepared by Example 3 and Example 4. During the DSC measurements, it could be observed that the endothermic curves of the polyurethanes of Example 3 and Example 4 had relatively flat endothermic plateau. In addition, the endothermic curve of Example 3 had an endothermic softening peak at about 183° C., and the endothermic curve of Example 4 had an endothermic softening peak at about 185° C., indicating that linear-segmented polyurethane had endothermic softening, flowability and adhesion properties. The DSC measurements Example 3 and Example 4 showed the peaks of glass transition temperature at 118° C. and 115° C.

Comparative Example 1 to Comparative Example 3

The polyurethane solutions of Comparative example 1 to Comparative example 3 were prepared by the method of Example 1 with the raw material having parts by weight ratio as shown in the table 1. The DSC measurements were performed. No obvious endothermic softening peak and glass transition temperature peak were observed, indicating that a linear-segmented polyurethane had endothermic softening, flowability and adhesion properties.

TABLE 1

| Polyurethane composition | Acrylic resin (parts by weight) | | | | | |
|---|---|---|---|---|---|---|
| | 2-HEMA | 2-HEA | i-BMA | 2-EHMA | SLMA | LMA |
| Example 1 | 5 | 5 | 65 | 0 | 15 | 10 |
| Example 2 | 5 | 5 | 60 | 5 | 15 | 10 |
| Example 3 | 5 | 10 | 55 | 5 | 15 | 10 |
| Example 4 | 5 | 10 | 55 | 5 | 10 | 15 |
| Example 5 | 5 | 10 | 55 | 5 | 10 | 15 |
| Comparative example 1 | 10 | 10 | 55 | 5 | 10 | 10 |
| Comparative example 2 | 10 | 15 | 55 | 5 | 5 | 10 |
| Comparative example 3 | 15 | 10 | 60 | 5 | 5 | 5 |

| Polyurethane composition | Polysiloxane (parts by weight) | Catalyst (parts by weight) | Aliphatic polyisocyanate (parts by weight) | Mixed Solvent (parts by weight) |
|---|---|---|---|---|

TABLE 1-continued

|  | | | | |
|---|---|---|---|---|
| Example 1 | 0 | 0.005 | 100 | 100 |
| Example 2 | 0.2 | 0.005 | 100 | 100 |
| Example 3 | 0.2 | 0.005 | 110 | 100 |
| Example 4 | 0.6 | 0.005 | 110 | 150 |
| Example 5 | 1.0 | 0.005 | 110 | 200 |
| Comparative example 1 | 0.6 | 0.005 | 110 | 150 |
| Comparative example 2 | 0.8 | 0.005 | 130 | 200 |
| Comparative example 3 | 1.2 | 0.005 | 150 | 200 |

Example 6 to Example 9

The polyurethane solutions of Example 2 and Example 4 were separately coated on the front surfaces of thermoplastic polyurethane layers (Matai PX93) having thicknesses of about 100 micrometers to 200 micrometers, and dried at about 80° C. to 120° C. to form a polyurethane film layer having a thickness of about 10 micrometers to 20 micrometers coated on the thermoplastic polyurethane layer. Next, another layer of the polyurethane solution was coated on the back surface of the thermoplastic polyurethane layer, and dried at about 80° C. to 120° C. to form a transparent elastic composite film having two polyurethane film layers on the opposing surfaces (polyurethane film layer/thermoplastic polyurethane layer/polyurethane film layer).

Next, the transparent elastic composite film with a structure of polyurethane film layer/thermoplastic polyurethane layer/polyurethane film layer of Example 6 to Example 9 was hot pressed to copper foil substrate used for a flexible printed circuit board (FPC) (PK-HTE-LP3, Lcy Technology Corp.). A hot pressing temperature range was from 150° C. to 180° C., the hot pressing time was about 10 minutes, and the hot pressing pressure was about 250 kgf. It could be observed that the transparent elastic composite film with a structure of polyurethane film layer/thermoplastic polyurethane layer/polyurethane film layer of Example 6 to Example 9 could fill-in the uneven surface morphology between the interfaces of the transparent elastic composite film and the copper foil substrate, and the voids therebetween. After cooling, the transparent elastic composite film with a structure of polyurethane film layer/thermoplastic polyurethane layer/polyurethane film layer of Example 6 to Example 9 would not adhere to the copper foil substrate, and could be completely peeled off from the copper foil substrate. A digital force meter push pull gauge was applied according to ASTM-D3300 standard to perform a 90 degrees peel test to measure the adhesion of the transparent elastic composite film with a structure of polyurethane film layer/thermoplastic polyurethane layer/polyurethane film layer with the copper foil substrate. The test results revealed that the adhesion strength was from 20 g to 25 g, indicating that the transparent elastic composite film were not firmly adhered to the copper foil substrate, and after the hot pressing process the transparent elastic composite film could be completely peeled off from the copper foil substrate. The experiment results described above are shown in the table 2.

Example 10 and Example 11

A bilayer structure having a thermoplastic polyurethane layer (Matai PX93) and a polyethylene terephthalate layer (Nan Ya, BH216) with a thickness of about 100 micrometers to 200 micrometers was provided. The polyurethane solution of Example 5 was coated on the front surface of the bilayer structure (i.e. the surface of the thermoplastic polyurethane layer), and dried at about 80° C. to 120° C. to form a polyurethane film layer coated on the thermoplastic polyurethane layer with bilayer structure. Next, another layer of the polyurethane solution was coated on the back surface of the bilayer structure having thermoplastic polyurethane layer and polyethylene terephthalate layer (i.e. the surface of the polyethylene terephthalate layer), and dried at about 80° C. to 120° C. to form a transparent elastic composite film having stacked thermoplastic polyurethane layer and polyethylene terephthalate layer with two polyurethane film layers on the opposing surfaces (polyurethane film layer/thermoplastic polyurethane layer/polyethylene terephthalate layer/polyurethane film layer).

Next, the transparent elastic composite film having the structure of polyurethane film layer/thermoplastic polyurethane layer/polyethylene terephthalate layer/polyurethane film layer of Example 10 and Example 11 was hot pressed to a copper foil substrate used for a flexible printed circuit board (FPC) (PK-HTE-LP3, Lcy Technology Corp.), wherein the front surface of the transparent elastic composite film (i.e. the surface of the polyurethane film layer coated on the surface of thermoplastic polyurethane layer) was adhered to copper foil substrate. The hot pressing temperature was from 150° C. to 180° C., the hot pressing time was about 10 minutes, and the hot pressing pressure was about 250 kgf. It could be observed that the transparent elastic composite film with a structure of polyurethane film layer/thermoplastic polyurethane layer/polyethylene terephthalate layer/polyurethane film layer of Example 10 and Example 11 could fill-in an uneven surface morphology between the interfaces of the transparent elastic composite film and the copper foil substrate, and the voids therebetween. After cooling, the transparent elastic composite film with a structure of polyurethane film layer/thermoplastic polyurethane layer/polyethylene terephthalate layer/polyurethane film layer of Example 10 and Example 11 were not firmly adhered to the copper foil substrate, and could be completely peeled off from the copper foil substrate. A digital force meter push pull gauge was applied according to ASTM-D3300 standard to perform a 90 degrees peel adhesion test to measure the adhesion of the transparent elastic composite film with a structure of polyurethane film layer/thermoplastic polyurethane layer/polyethylene terephthalate layer/polyurethane film layer with the copper foil substrate. The test results revealed that the adhesion strengths of Example 10 and Example 11 were 20 g to 23 g, indicating that the transparent elastic composite film were not firmly adhered to the copper foil substrate, and after the hot pressing process the transparent elastic composite film could be completely peeled off from the copper foil substrate. The experiment results described above are shown in the table 2.

Comparative Example 4

A thermoplastic polyurethane (Matai PX93) was hot pressed to a copper foil substrate used for a flexible printed circuit board (FPC) (PK-HTE-LP3, Lcy Technology Corp.). The hot pressing temperature was about 150° C., the hot pressing time was about 5 minutes, and the hot pressing pressure was about 250 kgf. It could be observed that the thermoplastic polyurethane (Matai PX93) could fill-in the uneven surface morphology between the interfaces of the thermoplastic polyurethane and the copper foil substrate, and the voids therebetween. After cooling the thermoplastic polyurethane layer of Comparative example 4 and the copper foil substrate was tightly bonded, and the thermoplastic polyurethane layer could not be completely peeled off from the copper foil substrate. A peel adhesion test between the thermoplastic polyurethane layer and the copper foil substrate was tested according to the ASTM D3300 standard. The experiment result reveals that the adhesion strength was larger than 200 g, indicating that the thermoplastic polyurethane of Comparative example 4 and the copper foil substrate bonded with each other tightly, and a very large adhesion strength was needed to peel the bonded film from the substrate. The experiment results described above are shown in the table 2.

Comparative Example 5

The polyurethane solution of Example 4 was coated on the front surface of a bilayer structure of thermoplastic polyurethane layer (Matai PX93)/polyethylene terephthalate layer (i.e. the surface of the thermoplastic polyurethane layer) having a thickness of about 100 micrometers to 200 micrometers so as to form a transparent elastic composite film having a structure of polyurethane film layer/thermoplastic polyurethane layer/polyethylene terephthalate layer of Example 5.

Next, the transparent elastic composite film having a structure of polyurethane film layer/thermoplastic polyurethane layer/polyethylene terephthalate layer of Example 5 was hot pressed to a copper foil substrate used for a flexible printed circuit board (FPC) (PK-HTE-LP3, Lcy Technology Corp.), wherein the front surface of the transparent elastic composite film (i.e. the surface of the thermoplastic polyurethane film layer with polyurethane film layer coated thereon) was adhered to the copper foil substrate. The hot pressing temperature was about 180° C., the hot pressing time was about 5 minutes, and the hot pressing pressure was about 250 kgf. After cooling, it could be observed that the transparent elastic composite film with a structure of polyurethane film layer/thermoplastic polyurethane layer/polyethylene terephthalate layer of Example 5 and the copper foil substrate tightly bonded with each other. The transparent elastic composite film could not be completely peeled off from the copper foil substrate, and the bonding adhesive residue remained. A peel adhesion test between the transparent elastic composite film and the copper foil substrate was tested according to the ASTM D3300 standard. The adhesion strength obtained by the test was larger than 150 g, indicating that the transparent elastic composite film of Comparative example 5 and the copper foil substrate bonded with each other, and a very large adhesion strength was needed to separate them. The experiment results described above are shown in the table 2.

TABLE 2

| Adhesion test | Polyurethane composition | Composite film structure | Temperature (° C.) |
|---|---|---|---|
| Example 6 | Example 2 | PU/TPU/PU | 150 |
| Example 7 | Example 2 | PU/TPU/PU | 180 |
| Example 8 | Example 4 | PU/TPU/PU | 150 |
| Example 9 | Example 4 | PU/TPU/PU | 180 |
| Example 10 | Example 5 | PU/TPU/PET/PU | 150 |
| Example 11 | Example 5 | PU/TPU/PET/PU | 180 |
| Comparative example 4 | — | TPU | 150 |
| Comparative example 5 | Example 4 | PU/TPU/PET | 180 |

| | Time | | Adhesion strength |

TABLE 2-continued

| Adhesion test | (min) | Result | (g) |
|---|---|---|---|
| Example 6 | 10 | completely peeled off | ≤23 |
| Example 7 | 10 | completely peeled off | ≤25 |
| Example 8 | 10 | completely peeled off | ≤22 |
| Example 9 | 10 | completely peeled off | ≤20 |
| Example 10 | 10 | completely peeled off | ≤23 |
| Example 11 | 10 | completely peeled off | ≤20 |
| Comparative example 4 | 5 | Tightly bonded | ≥200 |
| Comparative example 5 | 5 | Tightly bonded; adhesive residue remained | ≥150 |

Example 12

An encapsulation process was performed to encapsulate a transparent elastic composite film having a structure of polyurethane film layer/thermoplastic polyurethane layer/polyurethane film layer of Example 4, with a thermoplastic polyurethane substrate (TPU, produced by Chaei-Hsin Enterprise Co. Ltd., with a hardness of 85A) having a metal wiring disposed on the surface of the TPU substrate. During the encapsulation process, the transparent elastic composite film of Example 12 was hot pressed to the surface side of the thermoplastic polyurethane having the metal wiring disposed thereon. The hot pressing temperature was about 190° C., the hot pressing time was about 5 minutes, and the hot pressing pressure was about 250 kgf. In the experiment, it was observed that the transparent elastic composite film having a structure of polyurethane film layer/thermoplastic polyurethane layer/polyurethane film layer could be bonded to the thermoplastic polyurethane substrate having the metal wiring disposed thereon, and could fill-in an uneven surface morphology between the interfaces of the transparent elastic composite film and the thermoplastic polyurethane substrate having the metal wiring disposed thereon, and the voids therebetween. After cooling, the transparent elastic composite film having a structure of polyurethane film layer/thermoplastic polyurethane layer/polyurethane film layer of Example 12 was completely and tightly bonded to the thermoplastic polyurethane substrate having the metal wiring disposed thereon, so as to form an encapsulation structure of polyurethane film layer/thermoplastic polyurethane layer/polyurethane film layer/polyurethane layer having the metal wiring. An adhesion rating scale by tape test according to ASTM D3359 standard was performed to the encapsulation structure to measure adhesion rating scale between the transparent elastic composite film and the thermoplastic polyurethane substrate having the metal wiring. The adhesion by tape test revealed that the adhesion rating scale was 5B, indicating that no detachment was found. The experiment results described above are shown in the table 3.

Example 13

An encapsulation process was performed to encapsulate a transparent elastic composite film having a structure of polyurethane film layer/thermoplastic polyurethane layer/polyurethane film layer of Example 4 with a laminated structure of thermoplastic polyurethane layer substrate (TPU, produced by Chaei-Hsin Enterprise Co. Ltd., with a hardness of 85A) having a metal wiring/textile (Spandex, elastic fiber). During the encapsulation process, the transparent elastic composite film of Example 13 was hot pressed to the surface side of thermoplastic polyurethane having the metal wiring disposed thereon. The hot pressing temperature was about 190° C., the hot pressing time was about 5 minutes, and the hot pressing pressure was about 250 kgf. In the experiment, it was observed that the transparent elastic composite film having a structure of polyurethane film layer/thermoplastic polyurethane layer/polyurethane film layer could be bonded to the thermoplastic polyurethane layer having the metal wiring disposed thereon/textile, and could fill-in an uneven surface morphology between the interfaces of the transparent elastic composite film and the laminated structure of thermoplastic polyurethane layer having a metal wiring/textile and the voids therebetween. After cooling, the transparent elastic composite film having a structure of polyurethane film layer/thermoplastic polyurethane layer/polyurethane film layer of Example 13 was completely and tightly bonded to the laminated structure of thermoplastic polyurethane layer having the metal wiring/textile, so as to form an encapsulation structure of polyurethane film layer/thermoplastic polyurethane layer/polyurethane film layer/thermoplastic polyurethane layer having the metal wiring/textile. A rating adhesion by tape test according to ASTM D3359 standard was performed to the encapsulation structure to measure an adhesion rating scale between the transparent elastic composite film and the thermoplastic substrate having the metal wiring. The adhesion by tape test revealed that adhesion rating scale was 5B, indicating that no detachment was found. The experiment results described above are shown in the table 3.

Comparative Example 6

An encapsulation process was performed to encapsulate a thermoplastic polyurethane substrate (TPU, produced by Chaei-Hsin Enterprise Co. Ltd., with a hardness of 85A) having a metal wiring disposed on the surface of the TPU substrate with a transparent elastic composite film having a structure of polyurethane film layer/thermoplastic polyurethane layer/polyurethane film layer of Example 4. During the encapsulation process, the transparent elastic composite film of Comparative example 6 was hot pressed to the surface side of the thermoplastic polyurethane having the metal wiring disposed thereon. The hot pressing temperature of was about 150° C. The hot pressing time was about 5 minutes, and the hot pressing pressure was about 250 kgf. After cooling, it was observed that the transparent elastic composite film having a structure of polyurethane film layer/thermoplastic polyurethane layer/polyurethane film layer of Comparative example 6 could not be bonded to thermoplastic polyurethane substrate having the metal wiring. A rating adhesion by tape test according to ASTM D3359 standard was performed to the encapsulation structure to measure an adhesion rating scale between the transparent elastic composite film and the thermoplastic polyurethane substrate having the metal wiring. The adhesion by tape test revealed that the adhesion rating scale was 0B, indicating flaking and detachment of an area larger than 65%. The experiment results described above are shown in the table 3.

Comparative Example 7

An encapsulation process was performed to encapsulate a thermoplastic polyurethane substrate (TPU, produced by Chaei-Hsin Enterprise Co. Ltd., with a hardness of 85A) having a metal wiring disposed on the surface of the TPU substrate with a transparent elastic composite film having a structure of polyurethane film layer/thermoplastic polyurethane layer/polyurethane film layer of Example 4. During the encapsulation process, the transparent elastic composite film of Comparative example 7 was hot pressed to the surface side of the thermoplastic polyurethane having the metal wiring disposed thereon. The hot pressing temperature was about 180° C., the hot pressing time was about 5 minutes, and the hot pressing pressure was about 250 kgf. After cooling, it was observed that the transparent elastic composite film having a structure of polyurethane film layer/thermoplastic polyurethane layer/polyurethane film layer of Comparative example 7 could not be bonded to thermoplastic polyurethane substrate having the metal wiring. A rating adhesion by tape test according to ASTM D3359 standard was performed to the encapsulation structure for rating the adhesion scale between the transparent elastic composite film and the thermoplastic polyurethane substrate having the metal wiring. The adhesion by tape test revealed that the adhesion rating scale was 0B, indicating flaking and detachment of an area larger than 65%. The experiment results described above are shown in the table 3.

TABLE 3

| Encapsulation process | Polyurethane composition | Composite film structure | Substrate |
|---|---|---|---|
| Example 12 | Example 4 | PU/TPU/PU | wiring + TPU |
| Example 13 | Example 4 | PU/TPU/PU | wiring + TPU + textile |
| Comparative example 6 | Example 4 | PU/TPU/PU | wiring + TPU |
| Comparative example 7 | Example 4 | PU/TPU/PU | wiring + TPU |

| Encapsulation process | Temperature (° C.) | Time (min) | Encapsulable | Adhesion rating scale |
|---|---|---|---|---|
| Example 12 | 190 | 5 | O | 5B |
| Example 13 | 190 | 5 | O | 5B |
| Comparative example 6 | 150 | 5 | X | 0B |
| Comparative example 7 | 180 | 5 | X | 0B |

Accordingly, in the present disclosure, the peeling or encapsulating properties of the transparent elastic composite film having a structure of polyurethane film layer/thermoplastic polyurethane layer/polyurethane film layer with a substrate could be adjusted through tuning the compositions of the polyurethane film layer and the hot pressing conditions of the transparent elastic composite film. The transparent elastic composite film having a structure of polyurethane film layer/thermoplastic polyurethane layer/polyurethane film layer of the present disclosure, is easy to integrate to various electronic devices processing. During the hot pressing process, the transparent elastic composite film can conform to the substrate or to fill-in the uneven structure of the substrate, to inhibit glue overflowing or to prevent device structure damaging.

The invention is disclosed in, but not limited to, the above embodiments. It is possible for anyone with ordinary skills in the related art to make some alterations and modifications without departing from the spirit and scope of the invention. Therefore, the protection scope of the invention shall depend on the appended claims.

What is claimed is:
1. A transparent elastic composite film, comprising:
a first film layer;
a thermoplastic polyurethane layer disposed on the first film layer; and a second film layer disposed on the thermoplastic polyurethane layer;

wherein the first film layer and the second film layer have crosslinked network structures; the first film layer comprises acrylic resin and aliphatic polyisocyanate, and the acrylic resin comprises hydroxyl-containing acrylic resin, wherein a weight ratio of the acrylic resin to the aliphatic polyisocyanate is 1/1 to 1/1.2, a weight ratio of the hydroxyl-containing acrylic resin to the acrylic resin is 0.1/1 to 0.18/1.

2. The transparent elastic composite film according to claim 1, further comprising a polymer disposed between the second film layer and the thermoplastic polyurethane layer.

3. The transparent elastic composite film according to claim 2, wherein the polymer comprises polyethylene terephthalate, polycarbonate or polyimide.

4. The transparent elastic composite film according to claim 1, wherein the acrylic resin comprises 2-hydroxyethyl methacrylate, hydroxyethyl acrylate, isobutyl methacrylate, alkyl methacrylate, dodecyl methacrylate or a combination thereof.

5. The transparent elastic composite film according to claim 1, wherein the aliphatic polyisocyanate comprises hexamethylene diisocyanate, hexamethylene diisocyanate trimer, hexamethylene diisocyanate biuret, isophorone diisocyanate trimer or a combination thereof.

6. The transparent elastic composite film according to claim 1, wherein the first film layer further comprises polysiloxane, urethanizing catalyst, solvent or a mixture thereof.

7. The transparent elastic composite film according to claim 6, wherein the solvent comprises butanone, butyl acetate, ethyl acetate or a combination thereof.

8. The transparent elastic composite film according to claim 6, wherein a weight ratio to the acrylic resin to the polysiloxane of the first film layer is 1/0.001 to 1/0.02.

9. The transparent elastic composite film according to claim 6, wherein a weight ratio of the acrylic resin and the solvent of the first film layer is 1/1 to 1/2.5.

10. The transparent elastic composite film according to claim 1, wherein a composition of the first film layer and a composition of the second film layer is the same.

11. The transparent elastic composite film according to claim 1, wherein a composition of the first film layer and a composition of the second film layer is different.

12. The transparent elastic composite film according to claim 1, wherein the transparent elastic composite film is a release film.

13. An encapsulation structure of a transparent elastic composite film, comprising:
a first body, having at least a first surface;
a first film layer, disposed on the first surface of the first body;
a thermoplastic polyurethane layer, disposed on the first film layer; and
a second film layer, disposed on thermoplastic polyurethane layer; wherein the first film layer and the second film layer have crosslinked network structures; the first film layer includes acrylic resin and aliphatic polyisocyanate, and the acrylic resin includes hydroxyl-containing acrylic resin, wherein a weight ratio of the acrylic resin to the aliphatic polyisocyanate is 1/1 to 1/1.2, a weight ratio of the hydroxyl-containing acrylic resin to the acrylic resin is 0.1/1 to 0.18/1.

14. The encapsulation structure of the transparent elastic composite film according to claim 13, further comprising a polymer disposed between the second film layer and the thermoplastic polyurethane layer, wherein the polymer comprises polyethylene terephthalate, polycarbonate or polyimide.

15. The encapsulation structure of the transparent elastic composite film according to claim 13, wherein the first film layer further comprises polysiloxane, urethanizing catalyst and solvent.

16. The encapsulation structure of the transparent elastic composite film according to claim 13, wherein the first body comprises copper foil, polyethylene terephthalate, thermoplastic polyurethane layer, thermoset polyurethane layer or thermoplastic polyester elastomer.

17. The encapsulation structure of the transparent elastic composite film according to claim 13, wherein the first body has an uneven structure.

18. The encapsulation structure of the transparent elastic composite film according to claim 13, wherein the first surface of the first body has a metal wiring disposed thereon.

19. The encapsulation structure of the transparent elastic composite film according to claim 18, further comprising a second body disposed on a second surface of the first body, wherein the second surface opposes the first surface having the metal wiring arranged thereon.

20. The encapsulation structure of the transparent elastic composite film according to claim 19, wherein the second body comprises textile, polyethylene terephthalate, thermoplastic polyurethane layer, thermoset polyurethane layer, or thermoplastic polyester elastomer.

21. An encapsulation process, comprising encapsulating the transparent elastic composite film according to claim 1 on a surface of a body by using a hot pressing.

22. The encapsulating process according to claim 21, wherein when a temperature of the hot pressing is 150° C. to 180° C., an adhesion strength of the transparent elastic composite film from the surface of the body is ≤25 g.

23. The encapsulating process according to claim 21, wherein when a temperature of the hot pressing is 190° C. to 200° C., a peeling force of the transparent elastic composite film from the surface of the body is class 5B.

* * * * *